United States Patent
Glenn et al.

(10) Patent No.: US 11,144,929 B1
(45) Date of Patent: Oct. 12, 2021

(54) INTERACTION HISTORY DATABASE

(71) Applicant: T-Mobile Innovations LLC, Overland Park, KS (US)

(72) Inventors: John R. Glenn, Overland Park, KS (US); Keith E. Lawson, Madison, WI (US); Justin T. Leonard, Kildeer, IL (US)

(73) Assignee: Sprint Communications Company L.P., Overland Park, KS (US)

( * ) Notice: Subject to any disclaimer, the term of this patent is extended or adjusted under 35 U.S.C. 154(b) by 834 days.

(21) Appl. No.: 14/326,244

(22) Filed: Jul. 8, 2014

(51) Int. Cl.
*G06Q 30/00* (2012.01)

(52) U.S. Cl.
CPC .................. *G06Q 30/016* (2013.01)

(58) Field of Classification Search
CPC ..................................... G06Q 30/016
USPC ........................................... 705/304
See application file for complete search history.

(56) References Cited

U.S. PATENT DOCUMENTS

| | | | |
|---|---|---|---|
| 6,886,037 B1 | 4/2005 | Brewer et al. | |
| 8,958,542 B1* | 2/2015 | Kaufman | H04M 3/00 379/265.11 |
| 10,055,743 B1 | 8/2018 | Cracchiolo et al. | |
| 2002/0072921 A1* | 6/2002 | Boland | G06Q 10/063 709/206 |
| 2003/0212558 A1* | 11/2003 | Matula | H04M 3/4938 704/260 |
| 2004/0172358 A1* | 9/2004 | Lent | G06Q 30/06 705/38 |
| 2006/0123005 A1* | 6/2006 | Burnett | G06F 21/6218 |
| 2007/0083418 A1* | 4/2007 | Quiring | G06Q 30/0201 705/7.29 |
| 2007/0165808 A1* | 7/2007 | Pieraccini | H04M 3/493 379/142.04 |
| 2008/0232575 A1* | 9/2008 | Gumbula | H04M 3/42221 379/265.11 |
| 2010/0285773 A1* | 11/2010 | Matsuda | H04M 15/00 455/406 |
| 2012/0316928 A1 | 12/2012 | Shankaran Nair et al. | |
| 2013/0124262 A1 | 5/2013 | Anchala | |
| 2013/0136247 A1* | 5/2013 | Stine | H04M 3/493 379/201.03 |

(Continued)

FOREIGN PATENT DOCUMENTS

WO  WO-2014088906 A1 *  6/2014  ......... G06Q 30/0261

OTHER PUBLICATIONS

Patterson; Migrating a Customer Query Between Support Channels; https://web.archive.org/web/20200918173121/https://www.helpscout.com/helpu/migrating-customer-query/ ; p. 1-7.*

(Continued)

*Primary Examiner* — Jerry O'Connor
*Assistant Examiner* — James Webb

(57) ABSTRACT

Embodiments of the disclosure relate generally to methods and systems for monitoring customer service channels and directing a customer's interaction with the customer service channels based on previous interaction information. A database may be operable to receive and analyze information from a plurality of customer service channels. The database may be operable to receive, store, analyze, categorize, search, and report the information received from the customer service channels, wherein a customer service system may utilize the information in the database to direct customer interactions.

17 Claims, 4 Drawing Sheets

(56) References Cited

U.S. PATENT DOCUMENTS

| | | |
|---|---|---|
| 2013/0136253 A1* | 5/2013 | Liberman Ben-Ami ................... H04M 3/5191 379/265.09 |
| 2013/0185176 A1 | 7/2013 | Anchala |
| 2014/0207614 A1* | 7/2014 | Ramaswamy ..... G06Q 30/0613 705/26.41 |
| 2014/0337151 A1* | 11/2014 | Crutchfield ........... G06F 1/1601 705/17 |
| 2015/0051957 A1 | 2/2015 | Griebeler et al. |
| 2015/0339677 A1 | 11/2015 | Chan et al. |
| 2017/0091390 A1* | 3/2017 | Joul .................... G06Q 30/016 |

OTHER PUBLICATIONS

Faipp Pre-Interview Communication dated Apr. 21, 2017, U.S. Appl. No. 14/322,919, filed Jul. 3, 2014.
Faipp Office Action dated Jun. 26, 2017, U.S. Appl. No. 14/322,919, filed Jul. 3, 2014.
Cracchiolo, Meredith M., et al., "System and Method of Managing Customer Care," filed Jul. 3, 2014, U.S. Appl. No. 14/322,919.
Final Office Action dated Nov. 28, 2017, U.S. Appl. No. 14/322,919, filed Jul. 3, 2014.
Advisory Action dated Feb. 16, 2018, U.S. Appl. No. 14/322,919, filed Jul. 3, 2014.
Notice of Allowance dated May 1, 2018, U.S. Appl. No. 14/322,919, filed Jul. 3, 2014.

* cited by examiner

INTERACTION HISTORY DATABASE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Customer service channels may be operated to provide service and support to customers of a mobile communication service provider. A customer may contact a customer service channel with an issue or question, which may then be handled by the customer service channel or directed to another customer service channel. Customer service channels may include retail or store locations, a customer care call center, and/or a website.

SUMMARY

In an embodiment, a method for monitoring customer service channels and directing a customer's interaction with the customer service channels based on previous interaction information is disclosed. The method comprises: monitoring the interactions of customers with a plurality of customer service channels, wherein the customer service channels comprise a retail store customer service channel, a customer care center customer service channel, and a website customer service channel; storing information from the interactions from the plurality of customer service channels to an interaction history database, wherein the information is associated with an identifier for each customer; requesting information from the interaction history database whenever a new interaction is initiated by a customer by providing the customer's identifier; and automatically directing the new interaction though a tailored customer service treatment based on the information received from the interaction history database.

In an embodiment, a method for interacting with a customer via a customer service system is disclosed. The method comprises: monitoring a customer's interactions with a customer service system, wherein the customer service system comprises a plurality of customer service channels; storing information about the interactions to an interaction history database, wherein the information is associated with an identifier for the customer, and wherein at least part of the information includes the reason for the interaction; requesting information from the interaction history database whenever a new interaction is initiated by the customer by providing the customer's identifier; if the new interaction occurs within a predefined time period of a previous interaction, asking the customer at the beginning of the new interaction if the reason for the new interaction is the same as the reason for the previous interaction; and based on the customer's answer to the above question, directing the customer through a tailored customer service treatment.

In an embodiment, a computer system is disclosed. The computer system comprises: a memory; a processor; an interaction history database that: monitors the interactions of customers with a plurality of customer service channels, wherein the customer service channels comprise a retail store customer service channel, a customer care center customer service channel, and a website customer service channel; stores information from the interactions from the plurality of customer service channels, wherein the information is associated with an identifier for the customer; and reports information based on inquiries; and an application stored in the memory that, when executed by the processor, requests information from the interaction history database whenever a new interaction is initiated by a customer by providing the customer's identifier; and automatically directs the new interaction though a tailored customer service treatment based on the information received from the interaction history database, wherein the computer system is in communication with a customer service system comprising a plurality of customer service channels.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
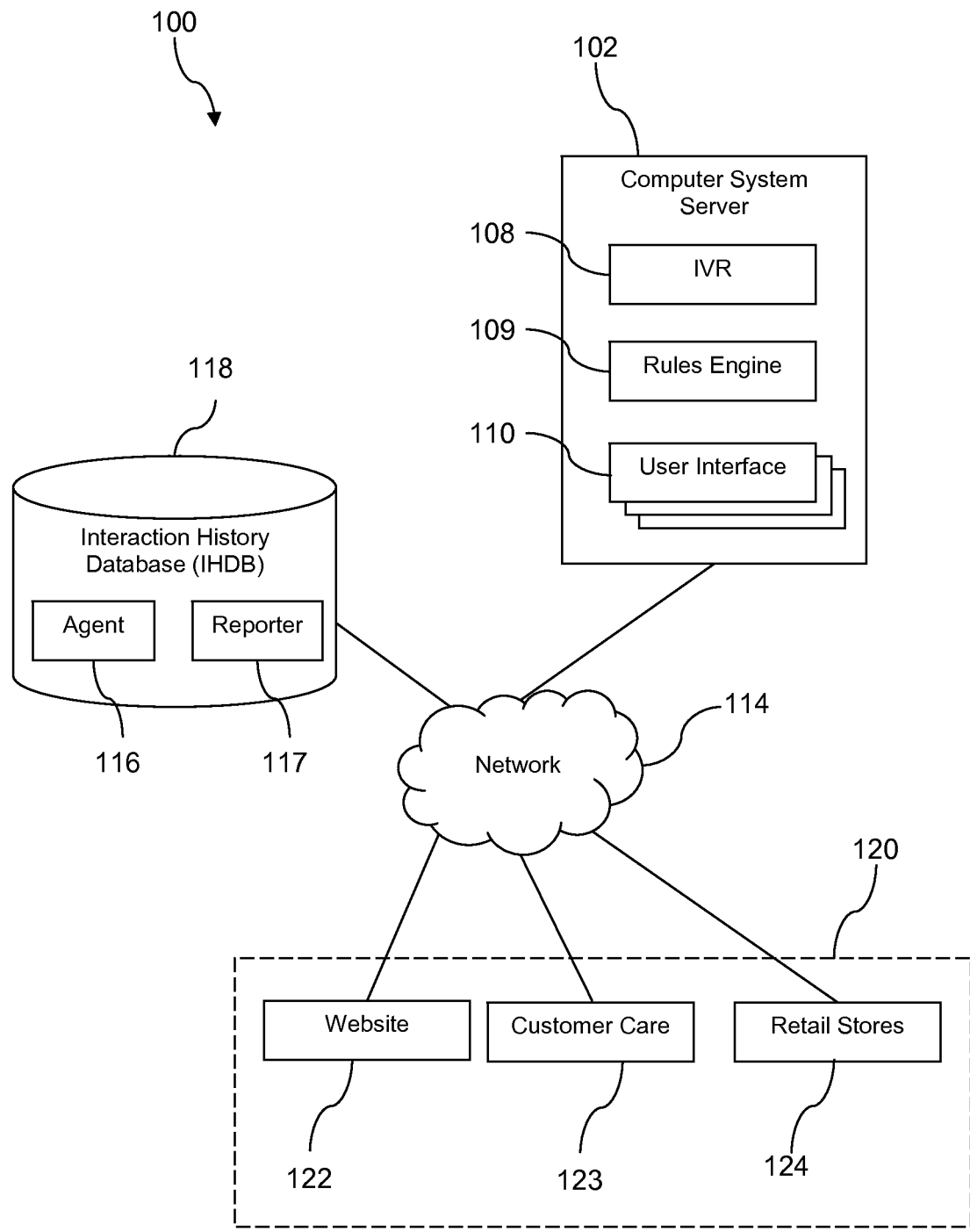
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure relate generally to methods and systems for monitoring customer service channels and directing a customer's interaction with the customer service channels based on previous interaction information. Customer service channels may be operable to handle service, issues, questions, and problems for customers of a communication service provider, for example, mobile device users. Customer service channels may include retail stores, customer care centers, and websites. A customer may visit a retail store to handle issues and/or questions concerning their device and/or service. A customer may also call a customer care center to handle an issue or question over the phone. Additionally, a customer may access a customer service website to find answers to a question or issue with their service and/or device.

A database, herein called an interaction history database (or IHDB), may be operable to receive and analyze information from a plurality of customer service channels. The IHDB may be operable to receive, store, analyze, categorize, search, and report the information received from the customer service channels. The IHDB may comprise an agent (wherein the agent comprises a computer program running on a processor) operable to search out and receive information from the customer service channels. The IHDB may also comprise a reporter (wherein the reporter comprises a computer program running on a processor) operable to report the information stored in the IHDB. The capabilities of the IHDB may be used to improve a customer's interaction experience with one or more of the customer service channels by tailoring the experience based on the information stored in the IHDB.

The IHDB may be in communication with a computer system comprising an interactive voice response (IVR) system as well as a user interface which may be used by a customer and/or a customer service agent communicating with a customer. The IHDB may communicate information to the IVR system and user interface to develop a treatment to be used whenever a customer initiates a contact with one of the customer service channels. Additionally, the user interface may be used to input information that may be sent to the IHDB about customer interactions.

Customers may initiate contacts with a customer service channel, and the reason for the contact may be monitored by the customer service application and stored in the IHDB. Additionally, other information from the customer contact may be stored, such as the results of the contact, the containment of the contact, any movement (or bounce) of the customer between customer service channels, and customer satisfaction survey results, for example. Containment may be defined as lack of movement between customer service channels when attempting to resolve an issue. Movement may be defined as a customer contacting a first customer service channel, and then, within a pre-defined time period, contacting a second customer service channel. Inherent in the idea of movement defined here is the assumption that if the customer contacts customer service again within a relatively short period of time, within the pre-defined time period, the customer is continuing to seek assistance to resolve the same issue with his or her mobile device or service account. It is understood that in some cases this assumption is not correct: in some cases a customer may call back within the pre-defined period of time but about a second, unrelated issue or question.

The IHDB may be operable to optimize the capabilities of all of the customer service channels by guiding the customer experience to utilize the channel with the most efficient and effective results for a particular issue or reason for contact. Utilizing the IHDB when directing customer service experiences may provide continuity and communication between channels. The IHDB may be capable of capturing transaction info from all channels and combining this information by customer identifier, so a user doesn't have to start from scratch when moving between customer service channels.

Turning now to FIG. 1, a communication system 100 is described. The communication system 100 may comprise a computer system 102 comprising an IVR system 108, a rules engine 109, and one or more user interface 110. The computer system 102 may communicate with a network 114 via a wired or wireless connection. The network 114 may be a private network, a public network, or a combination thereof. The network 114 may promote voice communications and data communications. Portions of the network 114 may provide an IP Multimedia Subsystem (IMS) network.

In some embodiments, the computer system 102 may communicate with an interaction history database (IHDB) 118 over the network 114, wherein the IHDB 118 may communicate information to and receive customer service information from the computer system. In some embodiments, the IHDB 118 may also be known as an interaction hub. In some embodiments, the customer service information may comprise information concerning customer initiated contacts with one or more customer service channels 120 provided by a mobile communication service provider. In some embodiments, the customer service information may also comprise customer satisfaction reports. The multiple customer service channels 120 may comprise retail stores 124, customer care centers 123, and websites 122.

A customer may contact one of the customer service channels 120 for any number of reasons, including problems or issues with their mobile communication service or device. For example, the reason for a customer initiated contact may be a problem with their mobile communication device that requires a repair or a replacement of the device. The reasons for each customer initiated contact may be monitored, recorded, and stored in the IHDB 118 by each of the customer service channels 120, wherein these reasons may be recorded automatically by the computer system 102 or may be recorded manually by a customer service agent using the computer system 102. Additionally, other information about contacts with a customer service channel 120 may be recorded and stored in the IHDB 118, such as customer satisfaction, movement of the customer between customer service channels, results of the customer initiated contact, and/or deactivation rates from the customer imitated contacts, and the like.

In some embodiments, the IHDB 118 may comprise an agent 116 operable to search out and receive information from the customer service channels 120. The IHDB 118 may also comprise a reporter 117 operable to report the information stored in the IHDB 118. The agent 116 is a software component, computer program, or computer application that may execute on a server computer. The reporter 117 is a software component, computer program, or computer application that may execute on a server computer. The IHDB 118 may comprise a data storage device as well as a server computer or computer system that executes the agent 116 and the reporter 117. In an embodiment, the agent 116 and the reporter 117 may execute on the computer system server 102.

In some embodiments, the IHDB 118 may be operable to analyze the information stored in and/or obtained from the customer service channels 120. The information may comprise reasons for the customer initiated contact, the channel where the contact was initiated, containment of the contact, movement of the contact within a determined time period (such as a number of days), customer satisfaction results related to the contact, results of the customer initiated contact, etc. The IHDB 118 may be operable to generate reports, via the reporter 117, of the information received from each of the customer service channels 120 and/or database 118, wherein the reports may comprise information gathered from multiple customer service channels 120.

In some embodiments, the user interface(s) 110 of the computer system 102 may comprise a customer service interface used by customer service agents at the customer care center 123 customer service channels and/or the retail stores 124 customer service channel, and may be known as a customer support tool (CST). In other embodiments, the user interface 110 may comprise a website interface used by customers when they access the website 122 customer service channel. In yet other embodiments, the user interface 110 may embody both of the above mentioned interfaces, among other examples of a user interface which may be used by a customer service channel 120. In some embodiments, information about customer interactions may be input via the user interface(s) 110 and then stored by the agent 116 of the IHDB 118.

In some embodiments, the rules engine 109 of the computer system 102 may facilitate communication between the IHDB 118 and the IVR 108 and/or user interface(s) 110. The rules engine 109 may serve as an intermediary between the IHDB 118 and the computer system 102. For example, when the IVR 108 receives a call (via the customer care channel 123), information about the identity of the caller (such as a phone number) may be sent to the rules engine 109, wherein the rules engine 109 may then request information from the IHDB 118. Then, based on the information received from the IHDB 118, the rules engine 109 may then generate a code to be sent to the IVR 108. The code may indicate a treatment procedure that the IVR 108 should follow based on the information in the IHDB 118 related to the customer calling the customer care channel 123. In some embodiments, the code generated by the rules engine 109 may comprise a six-digit code. In some embodiments, this code may indicate that a special treatment is to be used for the transaction, based on the information in the IHDB 118. In other embodiments, the code may indicate that a standard treatment should be used for the transaction. Additionally, in some embodiments, the user interface(s) 110 of the computer system 102 may communicate with the IHDB 118 in a similar fashion, via the rules engine 109.

In some embodiments, when information is stored to the IHDB 118 via the agent 116, a standard format may be used by all of the sources of information. For example, each the input information may be required to contain certain fields of information, such as account number, phone number, reason for transaction, or other similar information. Additional information may also be included, but there may be a set of fields that are required for the transaction information to be stored by the IHDB 118. This may force information received from a variety of different sources to be in a similar format, making the information easier to search and easier to write rules against, such as by the rules engine 109.

In some embodiments, the variety of sources that may send information to the IHDB 118 may comprise different systems that monitor customer service transactions. For example, customer service sources may comprise order sources, transaction sources, interaction sources, memo sources, claims sources, returns sources, ticket sources, incoming call sources, web session/cart sources, and the like. Each of the sources may be associated with one or more of the customer service channels 120.

The IHDB 118 may be utilized by the customer service channels 120 in a variety of ways. In one example, a customer may be interacting with the customer care center 123, and the call may be dropped. When the customer calls back, the IVR 108 (via the rules engine 109) may direct the customer back to the agent they were speaking with, or ask the customer if they are calling for the same reason as before. Additionally, a new interaction may be with the customer care center 123, and based on the reason for the call and/or information from the IHDB 118, the customer may be directed to end the call, restart their mobile device, and call the customer care center 123 again. Then, the tailored customer service treatment of the IVR 108 may comprise picking up the call at an advanced step in the treatment process when the customer calls the customer care center 123 again. For example, the treatment process may comprise multiple consecutive steps, wherein one step may be instructions to restart the device and call back. When the customer calls back, the number may be recognized as having completed the step of rebooting their device and may be directed to the next step in the treatment, rather than starting from the beginning.

In another example, a user may have visited a retail store 124 concerning a problem, and then within a certain time period, such as a day or two, the customer calls the customer care center 123. The IVR 108 (via the rules engine 109) may receive direction to use a special treatment for the customer, such as asking if the reason for their call matches the reason for the previous transaction. Similarly, a customer may call a customer care center 123 and may be unable to resolve their issue. They may then be directed to a retail store 124, wherein when the customer's information is input to the user interface 110 by a retail agent, the user interface 110 (via the rules engine 109) may access information from the IHDB 118 and indicate to the retail agent that the customer may be visiting for the same issue.

In some embodiments, a customer may call the customer care center 123, and based on the information received from the IHDB 118, may be directed to a retail store 124 without first being directed to an agent 116, such as if the issue might be better handled in person. The treatment directed by the rules engine 109 for either the IVR 108 or user interfaces 110 may vary depending on the information received from the IHDB 118, such as which channels have been accessed by the customer recently, what issues or reasons have been submitted by the customer recently, the recent purchase history of the customer, any plan changes associated with the customer, among other things.

In some embodiments, the IHDB 118 may be operable to generate proactive notifications which may be sent to users based on the information stored in the IHDB 118. Notifications may be used for updates for a purchased device, sales, payments, plan changes, etc. and may avoid unnecessary calls to the customer care center 123. Additionally, notifications may be facilitated by the computer system 102.

Information stored in the IHDB 118 may be useful for real-time customer interactions, and it may also be used for internal analytics for the mobile communication service provider, such as risk mitigation, pattern analysis, market analysis, etc. The information stored in the IHDB 118 may be analyzed over time to monitor customer service interactions, results, improvements, and problems.

Figure 2:
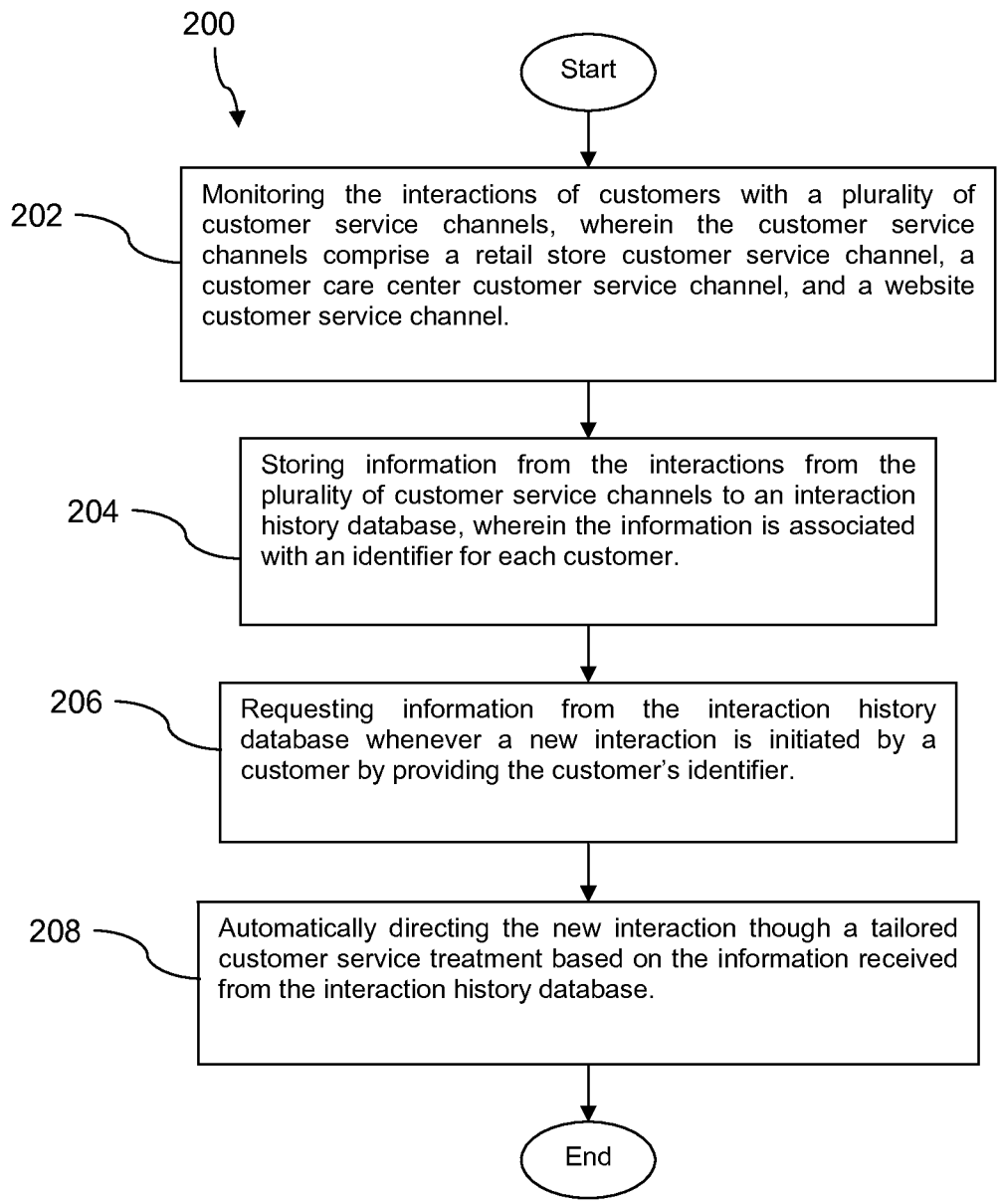
FIG. 2 is a flow chart illustrating a method according to an embodiment of the disclosure.

Turning now to FIG. 2, a method 200 for identifying customer service transformation opportunities is described. At block 202, the interactions of customers with a plurality of customer service channels may be monitored, wherein the customer service channels comprise a retail store customer service channel, a customer care center customer service channel, and a website customer service channel. At block 204, information may be stored from the interactions from the plurality of customer service channels to an interaction history database, wherein the information is associated with an identifier for each customer. At block 206, information may be requested from the interaction history database whenever a new interaction is initiated by a customer by providing the customer's identifier. At block 208, the new interaction may be automatically directed though a tailored customer service treatment based on the information received from the interaction history database. Method 200 may be said to be a method for monitoring customer service channels and directing a customer's interaction with the customer service channels based on previous interaction information.

In some embodiments, interaction information is stored from a plurality of sources associated with the customer service channels, the sources including order sources, transaction sources, interaction sources, memo sources, claims sources, returns sources, ticket sources, incoming call sources, and web session/cart sources. In some embodiments, the information stored in the interaction history database comprises the reason for the interactions, and wherein the tailored customer service treatment comprises asking the customer if the reason for their interaction is the same as the reason for a previous transaction and directing them accordingly. In some embodiments, the tailored customer service treatment comprises directing the customer to a specialist based on previous interaction information. In some embodiments, new interaction is with the customer care center, and the tailored customer service treatment comprises directing the customer to end the call, restart their mobile device, and call the customer care center again. In some embodiments, the tailored customer service treatment further comprises picking up the treatment at an advanced step when the customer calls the customer care center again. In some embodiments, based on the information received from the interaction history database, a new interaction may be directed to a retail store without first being directed to an agent, such as if the issue might be better handled in person. In some embodiments, the interaction history database may indicate that the customer was recently on a call with the customer care center that was dropped, and wherein, when the customer calls back, the treatment may comprise directing the customer back to the agent they were speaking with previously.

Figure 3:
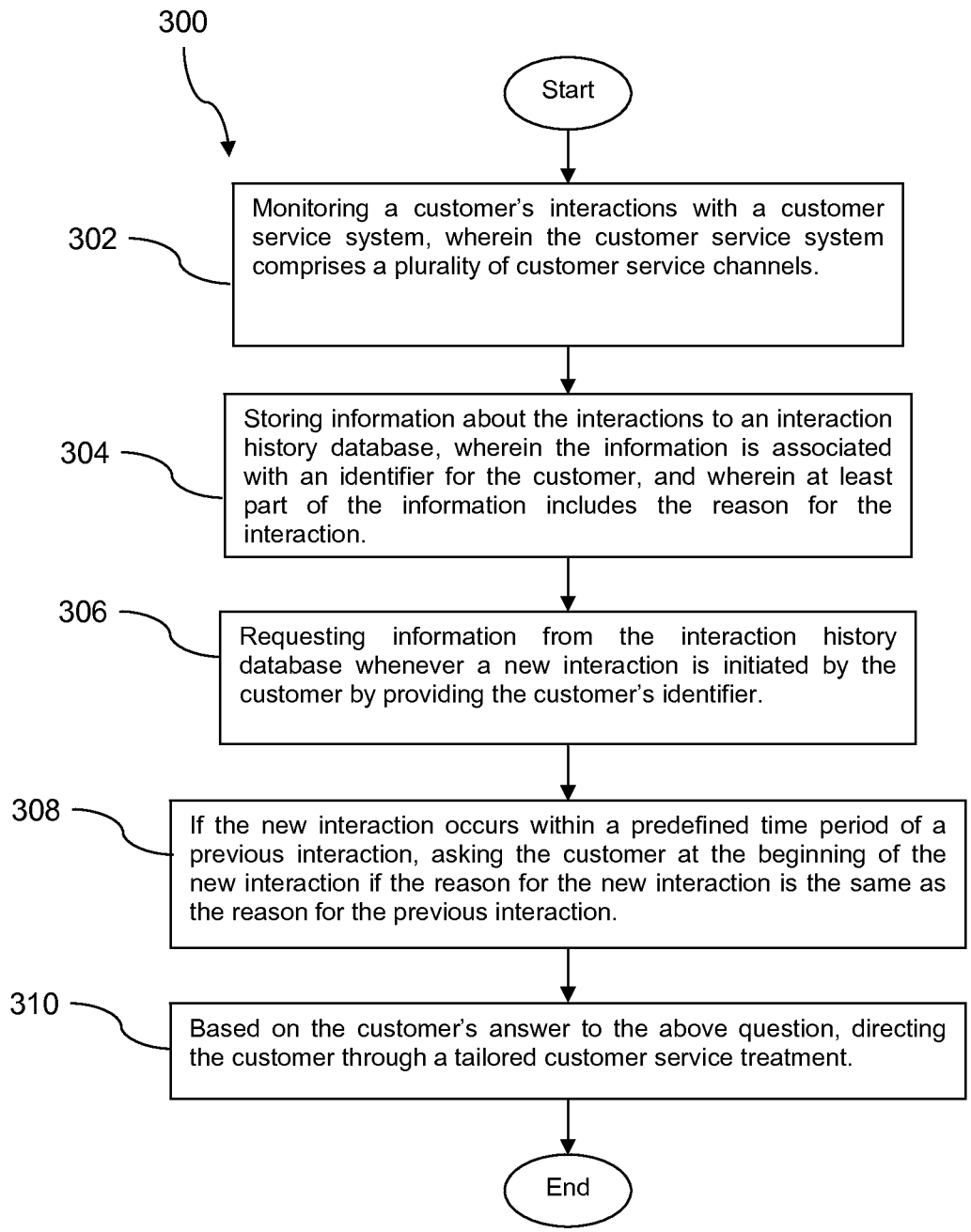
FIG. 3 is a flow chart illustrating another method according to an embodiment of the disclosure.

Turning now to FIG. 3, a method 300 for identifying improvements for customer service channels is described. At block 302, a customer's interactions with a customer service system may be monitored, wherein the customer service system comprises a plurality of customer service channels. At block 304, information may be stored about the interactions to an interaction history database, wherein the information is associated with an identifier for the customer, and wherein at least part of the information includes the reason for the interaction. At block 306, information may be requested from the interaction history database whenever a new interaction is initiated by the customer by providing the customer's identifier. At block 308, if the new interaction occurs within a predefined time period of a previous interaction, the customer may be asked at the beginning of the new interaction if the reason for the new interaction is the same as the reason for the previous interaction. At block 310, based on the customer's answer to the above question, the customer may be directed through a tailored customer service treatment.

In some embodiments, the customer service channels comprise a website, a customer care center, and retail stores. In some embodiments, the new interaction occurs at the customer care center, and asking is performed by an interactive voice system. In some embodiments, the new interaction occurs at a retail store, and the asking is performed by an employee at the retail store. In some embodiments, the new interaction occurs at a website, and the asking is performed by a pop-up window opened by the website.

It is understood that the methods described above with reference to FIG. 2 and FIG. 3 may be performed by any combination of the agent 116, the reporter 117, and the rules engine 109 described further above with reference to FIG. 1.

Figure 4:
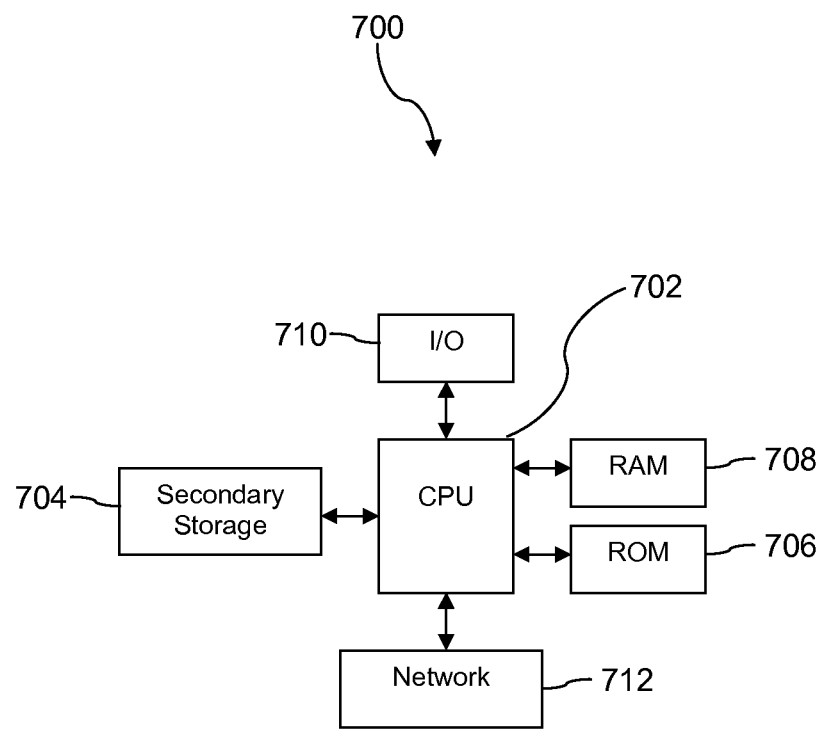
FIG. 4 is a block diagram of a computer system according to an embodiment of the disclosure.

FIG. 4 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented. Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for monitoring customer service channels and directing a customer's interaction with the customer service channels based on previous interaction information, the method comprising:
   monitoring, by an agent application of an interaction history database, the interactions of customers with a plurality of customer service channels, wherein the customer service channels comprise a retail store customer service channel, a customer care center customer service channel comprising at least an interactive voice response (IVR) system, and a website customer service channel;
   receiving, by a customer service channel monitoring system, information regarding an interaction by a customer with the retail store customer service channel, the interaction relating to a customer service operation beginning with a start point, where the customer exits the customer service operation at a step subsequent to the start point;
   storing, by the agent application, information from the interaction from the retail store customer service channel to the interaction history database, wherein the information is associated with an identifier for the customer;
   requesting, by the customer service channel monitoring system communicatively coupled to the interaction history database, information from the interaction history database whenever a new interaction is initiated by the customer by providing the customer's identifier to the interaction history database, wherein the new interaction is initiated by the customer in the customer care center customer service channel;
   receiving, from a rules engine, a code indicating that a special treatment is to be followed in handling the new interaction to continue the customer service operation from the retail store customer service channel in the customer care center customer service channel, wherein the code is determined according to the information from the interaction history database; and
   modifying, by the customer service channel monitoring system, handling of the new interaction based on the information received from the interaction history database and the code to begin the new interaction by continuing the customer service operation in the customer care center customer service channel from the step subsequent to the start point of the customer service operation, skipping one or more portions of the customer service operation from the start point to the step subsequent to the start point that were previously performed in the retail store customer service channel, wherein the IVR system includes a plurality of customer care call treatment processes that are selected among by the IVR system based on the code received from the interaction history database, the code uniquely corresponding to one of the customer care call treatment processes and indicating the one of the customer care call treatment processes of the IVR system corresponding to the step subsequent to the start point and causing the IVR system to skip the one or more portions of the customer service operation previously performed in the retail store customer service channel from the start point to the step subsequent to the start point.

2. The method of claim 1, wherein the interaction information is stored from a plurality of sources associated with the customer service channels, the sources including order sources, transaction sources, interaction sources, memo sources, claims sources, returns sources, ticket sources, incoming call sources, and web session/cart sources.

3. The method of claim 1, wherein the information stored in the interaction history database comprises the reason for the interactions, and wherein modifying handling of the new interaction comprises asking the customer if the reason for their interaction is the same as the reason for a previous transaction and directing them accordingly.

4. The method of claim 1, wherein modifying handling of the new interaction comprises directing the customer to a specialist based on previous interaction information.

5. The method of claim 1, wherein modifying handling of the new interaction comprises directing the customer to end the call, restart their mobile device, and call the customer care center again.

6. The method of claim 5, wherein modifying handling of the new interaction further comprises picking up the new interaction at an advanced step when the customer calls the customer care center again.

7. The method of claim 1, wherein, based on the information received from the interaction history database, modifying handling of the new interaction comprises directing the new interaction to a retail store without first being directed to an agent, such as if the issue might be better handled in person.

8. The method of claim 1, wherein the interaction history database may indicate that the customer was recently on a call with the customer care center that was dropped and wherein, when the customer calls back, modifying handling of the new interaction comprises directing the customer back to the agent they were speaking with previously.

9. A method for interacting with a customer via a customer service system, comprising:
   monitoring, by an agent application of an interaction history database, a customer's interactions with a customer service system, wherein the customer service system comprises a plurality of customer service channels comprising at least an interactive voice response (IVR) system;
   receiving, by a customer service channel monitoring system, information regarding an interaction by a customer with a retail store customer service channel, the interaction relating to a customer service operation beginning with a start point, where the customer exits the customer service operation at a step subsequent to the start point;
   storing, by the agent application, information about the interaction from the retail store customer service channel to the interaction history database, wherein the information is associated with an identifier for the customer, and wherein at least part of the information includes the reason for the interaction;
   requesting, by the customer service channel monitoring system communicatively coupled to the interaction history database, information from the interaction history database whenever a new interaction is initiated by the customer by providing the customer's identifier to the interaction history database, wherein the new interaction is initiated by the customer in the customer care center customer service channel;
if the new interaction occurs within a predefined time period of a previous interaction, asking, by the customer service channel monitoring system, the customer at the beginning of the new interaction if the reason for the new interaction is the same as the reason for the previous interaction;
receiving, from a rules engine, a code indicating that a special treatment is to be followed in handling the new interaction to continue the customer service operation from the retail store customer service channel in the customer care center customer service channel, wherein the code is determined according to the information from the interaction history database; and
based on the customer's answer to the above question, modifying, by the customer service channel monitoring system, handling of the new interaction based on the information received from the interaction history database and the code to begin the new interaction by continuing the customer service operation in the second of the plurality of customer service channels from the step subsequent to the start point, skipping one or more portions of the customer service operation from the start point to the step subsequent to the start point that were previously performed in the retail store customer service channel, wherein the IVR system includes a plurality of customer care call treatment processes that are selected among by the IVR system based on the code uniquely corresponding to one of the plurality of customer care call treatment processes and received from the interaction history database, the code indicating the one of the customer care call treatment processes of the IVR system corresponding to the step subsequent to the start point and causing the IVR system to skip the one or more portions of the customer service operation previously performed in the retail store customer service channel from the start point to the step subsequent to the start point.

10. The method of claim 9, wherein the customer service channels comprise a website, a customer care center, and retail stores.

11. A computer system in communication with a customer service system comprising a plurality of customer service channels and comprising:
a memory;
a processor;
an interaction history database that:
monitors the interactions of customers with a plurality of customer service channels, wherein the plurality of customer service channels comprise a retail store customer service channel, a customer care center customer service channel comprising at least an interactive voice response (IVR) system, and a website customer service channel;
receives information regarding an interaction by a customer with a retail store customer service channel, the interaction relating to a customer service operation beginning with a start point, where the customer exits the customer service operation at a step subsequent to the start point;
stores information from the interaction from the retail store customer service channel, wherein the information is associated with an identifier for the customer; and
reports information based on inquiries; and
an application stored in the memory that, when executed by the processor,
requests information from the interaction history database whenever a new interaction is initiated by the customer by providing the customer's identifier to the interaction history database, wherein the new interaction is initiated by the customer in the customer care center customer service channel;
receives, from a rules engine, a code indicating that a special treatment is to be followed in handling the new interaction to continue the customer service operation from the retail store customer service channel in the customer care center customer service channel, wherein the code is determined according to the information from the interaction history database; and
automatically modifies handling of the new interaction based on the information received from the interaction history database and the code to begin the new interaction by continuing the customer service operation in the customer care center customer service channel from the step subsequent to the start point of the customer service operation, skipping one or more portions of the customer service operation from the start point to the step subsequent to the start point that were previously performed in the retail store customer service channel, wherein the IVR system includes a plurality of customer care call treatment processes that are selected among by the IVR system based on the code uniquely corresponding to one of the customer care call treatment processes and received from the interaction history database, the code indicating the one of the customer care call treatment processes of the IVR system corresponding to the step subsequent to the start point and causing the IVR system to skip the one or more portions of the customer service operation previously performed in the retail store customer service channel from the start point to the step subsequent to the start point.

12. The system of claim 11, wherein the interaction history database comprises an agent component operable to receive and store information and a reporter component operable to report information.

13. The system of claim 11, wherein interaction information is stored from a plurality of systems associated with the customer service channels, the sources including order sources, transaction sources, interaction sources, memo sources, claims sources, returns sources, ticket sources, incoming call sources, and web session/cart sources.

14. The system of claim 13, wherein the information stored to the interaction history database from the plurality of sources is forced to adhere to a common format.

15. The system of claim 11, further comprising a rules engine that facilitates communication between the interaction history database and the application, and provides the rules to the application for modifying handling of the new interaction.

16. The system of claim 11, wherein the application comprises an interactive voice response system used by a customer care center.

17. The system of claim 11, wherein the application comprises a user interface used by a retail store or a customer service website.

* * * * *